US008457239B2

(12) United States Patent
Berens et al.

(10) Patent No.: US 8,457,239 B2
(45) Date of Patent: Jun. 4, 2013

(54) METHOD AND DEVICE FOR MANAGING THE OPERATION OF AN APPARATUS, FOR EXAMPLE AN MB-OFDM APPARATUS, IN PRESENCE OF AN EVENTUAL INTERFERING SIGNAL

(75) Inventors: Friedbert Berens, Geneva (CH); Andreas Rüegg, Biel-Benken (CH)

(73) Assignee: STMicroelectronics N.V., Amsterdam (NL)

( * ) Notice: Subject to any disclaimer, the term of this patent is extended or adjusted under 35 U.S.C. 154(b) by 1085 days.

(21) Appl. No.: 12/445,614

(22) PCT Filed: Oct. 15, 2007

(86) PCT No.: PCT/EP2007/060945
§ 371 (c)(1),
(2), (4) Date: Apr. 15, 2009

(87) PCT Pub. No.: WO2008/046804
PCT Pub. Date: Apr. 24, 2008

(65) Prior Publication Data
US 2011/0033000 A1    Feb. 10, 2011

(30) Foreign Application Priority Data
Oct. 16, 2006    (EP) .................................... 06021630

(51) Int. Cl.
*H04B 15/00*    (2006.01)
(52) U.S. Cl.
USPC ........... 375/285; 375/278; 375/284; 375/296; 455/63.1; 455/63.2; 455/63.3; 455/114.1; 455/114.2; 455/114.3; 455/501

(58) Field of Classification Search
USPC ................. 375/144, 148, 346, 284, 295, 278, 375/296, 260, 267, 131, 285; 455/63.1, 63.3, 455/63.4, 501, 63.2, 114.1, 114.2, 114.3
See application file for complete search history.

(56) References Cited

U.S. PATENT DOCUMENTS

| 7,342,973 B2 * | 3/2008 | Walker et al. ................. 375/260 |
| 7,675,984 B1 * | 3/2010 | Carbone et al. ............... 375/260 |
| 7,702,351 B2 * | 4/2010 | Soliman ........................ 455/522 |

(Continued)

FOREIGN PATENT DOCUMENTS

| EP | 1349337 A2 | 1/2003 |
| WO | 0055976 | 9/2000 |

(Continued)

*Primary Examiner* — Sophia Vlahos
(74) *Attorney, Agent, or Firm* — Allen, Dyer, Doppelt, Milbrath & Gilchrist, P.A.

(57) ABSTRACT

The method is for managing operation of a first apparatus belonging to a first communication system and exchanging within the first communication system a multi-carrier modulated signal on several sub-carriers. The method includes detecting at the first apparatus the presence of an interfering signal emitted from a victim apparatus on a sub-carrier. The method may also include determining at the first apparatus the path loss between both apparatuses, determining from the path loss and from an allowed interference level at the victim apparatus a maximum allowed transmit power on the sub-carrier of a multi-carrier modulated signal to be transmitted from the first apparatus, and adjusting within the first apparatus the processing of the multi-carrier modulated signal to be transmitted in accordance with the maximum allowed transmit power.

29 Claims, 10 Drawing Sheets

U.S. PATENT DOCUMENTS

| | | | |
|---|---|---|---|
| 2004/0120274 A1* | 6/2004 | Petre et al. | 370/320 |
| 2004/0141483 A1 | 7/2004 | Zeira et al. | 370/335 |
| 2004/0219943 A1 | 11/2004 | Terry et al. | 455/522 |
| 2006/0171445 A1* | 8/2006 | Batra et al. | 375/130 |
| 2006/0183495 A1 | 8/2006 | Soliman | 455/522 |

FOREIGN PATENT DOCUMENTS

| | | |
|---|---|---|
| WO | 2006081599 A2 | 8/2006 |
| WO | 2006091683 A2 | 8/2006 |
| WO | 2006094860 A1 | 9/2009 |

* cited by examiner

METHOD AND DEVICE FOR MANAGING THE OPERATION OF AN APPARATUS, FOR EXAMPLE AN MB-OFDM APPARATUS, IN PRESENCE OF AN EVENTUAL INTERFERING SIGNAL

FIELD OF THE INVENTION

The invention relates to the wireless communication systems, especially to the operation of an apparatus in the presence of an interfering signal, and more particularly, to the operation of an apparatus exchanging a multi-carrier modulated signal within such a wireless communication system in the presence of an interfering signal

BACKGROUND OF THE INVENTION

The present application is directed to devices operating according to the Ultra Wide Band (UWB) standard based on a multi-band Orthogonal Frequency-Division Multiplexing (OFDM) modulation scheme, called MB-OFDM, which can generate interference toward other wireless systems, and particularly, toward a Worldwide Interoperability for Microwave Access device, which is a fix wireless device (WIMAX). Such a WIMAX device operates, for example, in a bandwidth of 20 MHz at a central frequency of 3.5 GHz, whereas the frequency band of the MB-OFDM system lies between 3.1 and 10.6 GHz.

OFDM is a method of digital modulation where a signal is split into several narrowband channels (sub-carriers) at different frequencies. Wireless personal area networks based on OFDM and UWB technologies like the MB-OFDM standard may directly interfere with narrowband systems that are close to such wide band devices.

Due to the very limited transmission (TX) power of the UWB systems, the range in which the generated interference may cause degradation in another system or victim system is limited to several meters around the UWB device. Such system operating in this area may also generate interference towards the UWB system in operation and may lead to degradation of the communication performance. Thus, future robust implementations of UWB systems may take that into account to improve the performance of their own communication and to reduce the interference potential towards another service to a minimum.

SUMMARY OF THE INVENTION

According to an embodiment, a method and a device allow an improvement of an interfering avoidance mechanism in the sense of protection for the victim system and the performance/complexity of the apparatus exchanging the multi-carrier modulated signal, for example, an MB-OFDM apparatus. According to another embodiment, an interference avoidance strategy may provide protection to the victim service without putting burden onto the interfering UWB system.

According to an aspect, a method of managing is for operation of a first apparatus belonging to a wireless communication system, for example, an UWB communication system. The method comprises detecting at the first apparatus the presence of an interfering signal emitted from a second or victim apparatus, estimating among different interference power regions or isolation regions respectively corresponding to different interference powers or isolations between a potential first apparatus and a potential victim apparatus the region corresponding to the actual interference power or isolation between the first apparatus and the detected victim apparatus, and adjusting within the first apparatus the transmission processing of a signal to be transmitted within the wireless communication system in accordance with the estimated interference power region for protecting the victim apparatus against interference (for example, for obtaining at the victim apparatus an interference level smaller than or equal to an allowed interference level).

The adjusting step may comprise not modifying the transmission processing of the signal or performing an interference avoidance process selected among a set of at least one predetermined interference avoidance process, depending on the estimated interference power region. The set of predetermined interference avoidance processes may comprise for example, and in a non limiting way, a tone nulling process, a side lobe suppression process, and an active interference cancellation process. In other words, at least some of the interference power regions are associated to different interference avoidance processes, thereby providing flexible interference avoidance.

According to an embodiment, estimating the interference power region, i.e. estimating the impact of the first apparatus on the victim apparatus, includes determining at the first apparatus the level of the interfering signal. Each interference power region corresponds to a particular interference power or isolation between a first apparatus and a potential victim apparatus and the interference power or isolation may be represented by interference power information, such as the path loss between both apparatuses. Thus, according to an embodiment, estimating the interference power region may include determining at the first apparatus the path loss between the first apparatus and the detected victim apparatus. According to an embodiment, determining the path loss comprises determining at the first apparatus the level of the interfering signal and subtracting the level to the transmit power of the interfering signal.

The method of managing the operation of the first apparatus may further comprise determining from the path loss and from an allowed interference level at the victim apparatus a maximum allowed transmit power for the signal to be transmitted from the first apparatus, and the adjusting step may comprise adjusting within the first apparatus the transmission processing of signal to be transmitted in accordance with the maximum allowed transmit power for protecting the victim apparatus against interference.

The interfering signal may be a narrowband signal, and the second apparatus may be, for example, a WIMAX apparatus. However, other second or victim devices like radars, 4G and fix wireless devices or systems, or in-band victim devices not belonging to the wireless communication system and having an operational frequency band at least partially contained in the frequency band of the signal to be transmitted by the first apparatus can be protected using this managing method.

According to an embodiment, a method is for managing the operation of a first apparatus belonging to a first communication system and adapted to exchange a signal within the first communication system, for example, a multi-carrier modulated signal on several sub-carriers.

The method comprises detecting at the first apparatus the presence of an interfering signal emitted from a second or victim apparatus, for example, on at least one sub-carrier in case of a multi-carrier modulated signal, determining at the first apparatus the path loss between both apparatuses, determining from the path loss and from an allowed interference level at the victim apparatus a maximum allowed transmit power of a signal to be transmitted from the first apparatus, for example, on the at least one sub-carrier of a multi-carrier modulated signal to be transmitted, and adjusting within the first apparatus the transmission processing of the signal, for example, the multi-carrier modulated signal, to be transmitted in accordance with the maximum allowed transmit power.

In particular, by taking into account the estimated path loss from the victim system, the interference avoidance mechanism can be simplified and improved. The multi-carrier modulated signal may be a signal modulated according to an OFDM modulation scheme, for example, according to a MB-OFDM modulation scheme. The multi-carrier modulated signal may also be a signal modulated according to a generalized multi-carrier (GMC) modulation scheme in which the sub-carriers are not necessarily orthogonal.

Although several detection processes may be used, the detecting step comprises advantageously receiving at the first apparatus an incident multi-carrier modulated signal, performing a reception processing on the incident signal including an equalization processing providing a first signal, and detecting the presence of an interfering signal from a second signal in the frequency domain obtained from the first signal. Such an embodiment significantly improves the detection quality, in particular, when a victim-apparatus is super-imposed with an UWB signal.

In other words, the detection mechanism according to this embodiment is based on a signal, called here "second signal", which is delivered at a point in the receiving chain located after compensation of the channel, for example, directly after equalization or, for example, after demapping. An equalization flattens the channel and marks of interference appear more recognizable.

When the interference detecting step is performed directly after equalization, the second signal is equal to the first signal, i.e. the signal provided by the equalization processing. When at least another processing, for example, a demapping, is performed between the equalization processing and the interference detecting step, the second signal on which the interference detecting step is performed, is thus different from the first signal, i.e. the signal provided by the equalization processing, but still obtained from the first signal.

According to an embodiment in which the second signal comprises digital information, for example, so-called "soft" values or "soft" symbols, the interference detecting comprises determining statistical data from the digital information and processing the statistical data.

According to an embodiment, in which the incident signal carries symbols, the statistical data are mean values and/or variance values computed over a sliding time-window of consecutive symbols for each carrier independently. According to an embodiment, processing the statistical data comprises selecting a group of at least some of the sub-carriers, calculating an average value of the statistical data respectively associated to the selected sub-carriers, comparing one statistical data value with the average value, thereby deciding whether interference exists within the sub-carrier associated to the one statistical data value.

According to another aspect, an apparatus belongs to a wireless communication system and comprises a detector or detecting means adapted to detect the presence of an interfering signal emitted from a victim apparatus, an estimator or estimation means for estimating among different interference power regions or isolation regions respectively corresponding to different interference powers or isolations between a potential first apparatus and a potential victim apparatus the region corresponding to the actual interference power or isolation between the first apparatus and the detected victim apparatus, and a controller or control means adapted to adjust the processing of the signal to be transmitted in accordance with the estimated interference power region for protecting the victim apparatus against interference.

According to an embodiment, the estimation means comprises a determiner or determining means adapted to determine the level of the interfering signal. According to an embodiment, the estimation means comprises a first calculator or first calculation means adapted to determine at the apparatus the path loss between the first apparatus and the victim apparatus.

According to an embodiment, the apparatus further comprises a second calculator or second calculation means adapted to determine from the path loss and from an allowed interference level at the victim apparatus a maximum allowed transmit power of the signal to be transmitted from the apparatus, and the control means are adapted to adjust the processing of the signal to be transmitted in accordance with the maximum allowed transmit power for protecting the victim apparatus against interference.

According to an embodiment, the control means are adapted to not modifying the processing of the signal or to select an interference avoidance process among a set of at least one predetermined interference avoidance process and to activate the selected interference avoidance process, in accordance with the determined interference power region. The wireless communication system may be an UWB wireless communication system. The signal to be transmitted from the apparatus may be a multi-carrier modulated signal.

According to another variant, an apparatus belonging to a first communication system exchanges within the first communication system a multi-carrier modulated signal on several sub-carriers. The apparatus comprises a detector or detecting means adapted to detect the presence of an interfering signal emitted from a victim apparatus on at least one sub-carrier, a first calculator or first calculation means adapted to determine at the first apparatus the path loss between both apparatuses, a second calculator or second calculation means adapted to determine from the path loss and from an allowed interference level at the victim apparatus a maximum allowed transmit power on the at least one sub-carrier of a multi-carrier modulated signal to be transmitted from the apparatus, and a controller or control means adapted to adjust the transmission processing of the multi-carrier modulated signal to be transmitted in accordance with the maximum allowed transmit power.

According to an embodiment, the first calculation means comprises a determiner or determining means adapted to determine the level of the interfering signal and a subtractor or subtracting means adapted to subtract the level to the transmit power of the interfering signal. According to an embodiment, the control means are adapted to not modify the processing of the multi-carrier modulated signal or to select an interference avoidance process among a set of at least one predetermined interference avoidance process and to activate the selected interference avoidance process.

According to another embodiment, the apparatus comprises an input or input means adapted to receive an incident multi-carrier modulated signal and a reception processor or reception processing means coupled to the input means and including an equalizer or equalization means adapted to deliver a first signal. The apparatus further comprises a detector or detecting means coupled to the output of the equalization means for receiving a second signal in the frequency domain issued from the first signal and adapted to perform a digital detection process on the second signal for detecting interference within the incident signal. The detecting means may be directly or indirectly coupled to the output of the equalization means.

According to an embodiment, the second signal comprises digital information, and the detecting means comprises a computer or computing means adapted to compute statistical data from the digital information and an auxiliary processor or auxiliary processing means adapted to process the statistical data.

According to an embodiment, the incident signal carries symbols and a computer or computing means are adapted to compute as the statistical data, mean values and/or variance values over a sliding time-window of consecutive symbols for each sub-carrier independently.

According to another embodiment, the auxiliary processing means comprises a selector or selection means adapted to select a group of at least some of the sub-carriers, a calculator or calculation means adapted to calculate an average value of the statistical data respectively associated to the selected sub-carriers, and a comparing module or comparison means adapted to compare one statistical data value with the average value, thereby deciding whether interference exists within the sub-carrier associated to the one statistical data value.

BRIEF DESCRIPTION OF THE DRAWINGS

Other advantages and features may appear on examining the detailed description of embodiments, these being in no way limiting, and of the appended drawings in which.

DETAILED DESCRIPTION OF THE PREFERRED EMBODIMENTS

Figure 5:
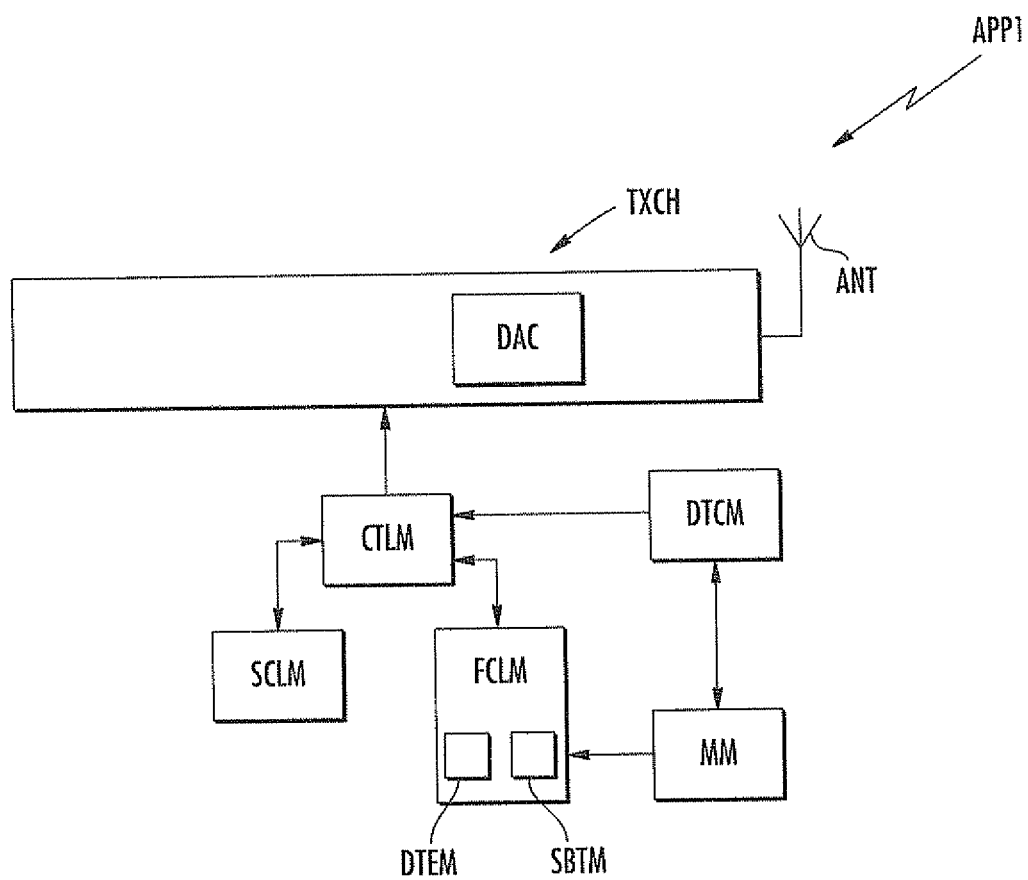
FIG. 5 illustrates diagrammatically an embodiment of an apparatus implementing an example of interference avoidance strategy, according to the present invention.

This embodiment may be now described in relation with MB-OFDM systems, although the invention is not limited to this particular application. Conventionally, a MB-OFDM digital base-band symbol includes 128 sub-carriers (corresponding to data, pilots, etc.). The transmitted data is generated by computing the Inverse Fast Fourier Transform (IFFT) of 128 frequency-domain digital base-band samples. As depicted in FIG. 5, a first apparatus APP1 according to this embodiment comprises a transmission chain TXCH including a digital base-band stage coupled to an analog radio frequency stage by a digital-to-analog conversion stage DAC.

More precisely, in a conventional manner, the transmission chain TXCH comprises an encoder, for example, a convolution encoder, receiving data from source coding means and delivering a bits stream to puncturing means which delivers a punctured bits streams. Interleaving means are connected to the output of the puncturing means and are followed by mapping means which map the bits into symbols according to a modulation mapping scheme depending on the kind of used modulation, for example, a BPSK modulation or more generally a QAM modulation.

The successive symbols delivered by the mapping means MPM are MB-OFDM digital base-band symbols. Each symbol is a group containing 128 modulation coefficients respectively associated to 128 sub-carriers to be modulated accordingly. Of course, a group of 128 samples (modulation coefficients) is delivered on the so-called I branch whereas another corresponding group of 128 samples is delivered on the so-called Q branch. These successive frequency-domain groups of digital modulation coefficients are then converted in the time domain by IFFT means. The delivered time-domain symbols are then processed in a radio frequency stage after having been converted into the DAC stage, and before being transmitted on air through an antenna ANT.

Figure 1:
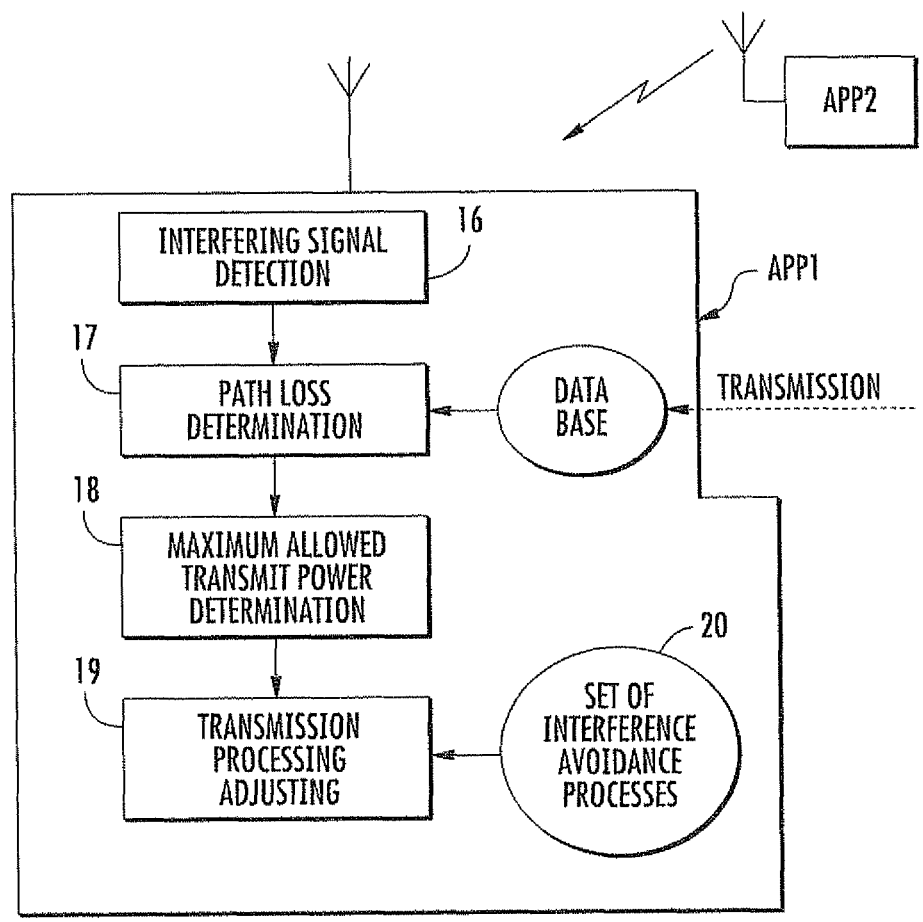
FIG. 1 illustrates diagrammatically a flow chart related to an embodiment of a method including an interference avoidance strategy, according to present invention.

In the illustrated example, a second or victim apparatus APP2 (FIG. 1), which is assumed to be a WIMAX device, is located in the vicinity of the first UWB apparatus APP1. As illustrated more particularly in FIG. 1, the impact of the UWB apparatus APP1 on the WIMAX apparatus APP2 may be estimated by measuring the interfering WIMAX power at the UWB apparatus APP1.

More precisely, after an interfering signal detection step 16 performed at the first apparatus APP1, the path loss between both apparatuses is determined (step 17). From this path loss, a maximum allowed transmit power determination on the sub-carrier(s) occupied by the victim apparatus APP2 is performed (step 18), and the transmission processing of the MB-OFDM signal to be transmitted from the apparatus APP1 is adjusted (step 19) by using eventually a set 20 of predetermined interference avoidance processes.

More precisely, the path loss is obtained by formula (1) below $$P_{Tx\_UWB} = P_{Rx\_victim} + \frac{P_{Tx\_victim} - P_{Rx\_UWB}}{path\ loss} \qquad (1)$$

In formula (1), PRx_victim is set to be the allowed interference level at the victim apparatus APP2, PTx_victim is the victim apparatus transmit power taken, for example, from the standard and PRx_UWB the measured interference from APP2 at the UWB device APP1. From this, the maximum (threshold) allowed transmit power PTx_UWB of apparatus APP1 in the concerned sub-bands (concerned sub-carriers occupied by the victim apparatus) is computed.

Figure 2:
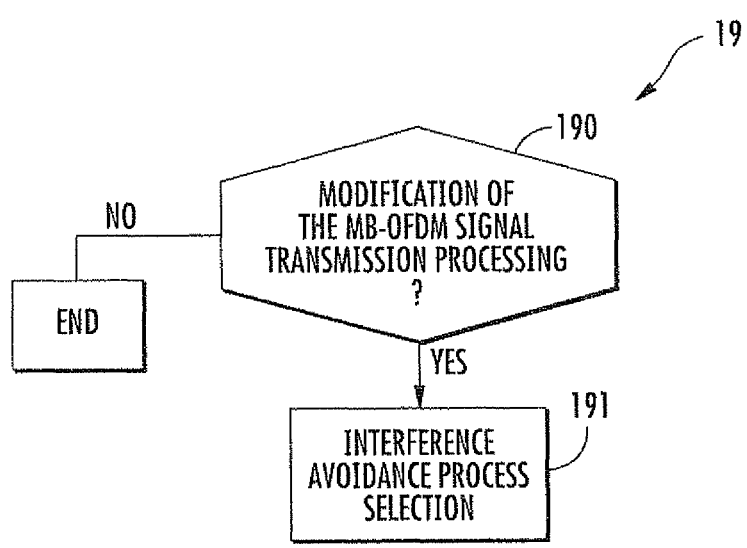
FIG. 2 illustrates diagrammatically but in more detail an example of a particular step of the method of FIG. 1.

Depending on the maximum allowed transmit power in the sub-carriers (sub-bands) occupied by the WIMAX apparatus APP2, a modification of the MB-OFDM signal transmission processing is decided or not (step 190, FIG. 2). In other words, the processing adjusting step 19 may include no modification of the MB-OFDM signal transmission processing. Otherwise, an interference avoidance process selection 191 is performed in order to select a most appropriate interference avoidance process among the set 20 of predetermined interference avoidance processes.

Although the victim apparatus transmit power PTx_victim can taken from the standard as indicated above, another possibility can include providing the first apparatus APP1 with a database containing the possible TX power levels of several potential victim systems and the possible frequency ranges used by these systems. This information could be also available in a UWB network coming from an UWB apparatus collocated to a WIMAX device in the same apparatus.

Figure 3:
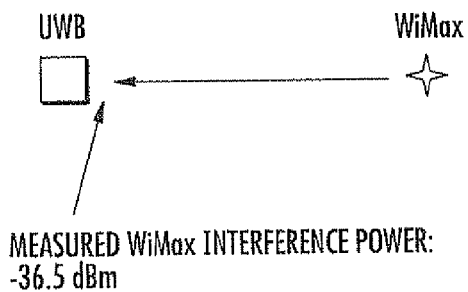
FIG. 3 illustrates a WIMAX towards UWB interference example, according to the present invention.

Another possibility of acquiring this information is the transmission via a simple broadcast channel which is associated with a victim apparatus or a base station. In such a channel, all needed information, including the TX power level and the operational band of the victim apparatus, could be transmitted to the UWB apparatus, i.e. the first apparatus APP1. In FIG. 3, an example of an UWB apparatus in vicinity of a WIMAX terminal is depicted. The UWB apparatus estimates the RX power from the WIMAX devices as being −36.5 dBm.

Taking into account a maximum TX power of 20 dBm of the WIMAX terminal, the UWB apparatus can now estimate the path loss as follows:

20 dBm−(−36.5 dBm)=56.5 dB

The resulting maximum allowed transmit power of the UWB apparatus computed for two different allowed WIMAX interference levels (−105 dBm/MHz and −115 dBm/MHz) is therefore:

−105 dBm/MHz+56.5 dB=−48.5 dBm/MHz

−115 dBm/MHz+56.5 dB=−58.5 dBm/MHz

These values indicate the depth of the needed notch used at the UWB device. In the first case, a simple tone nulling would be sufficient, whereas in the second case, a windowed notch is used to achieve the desired depth.

Figure 4:
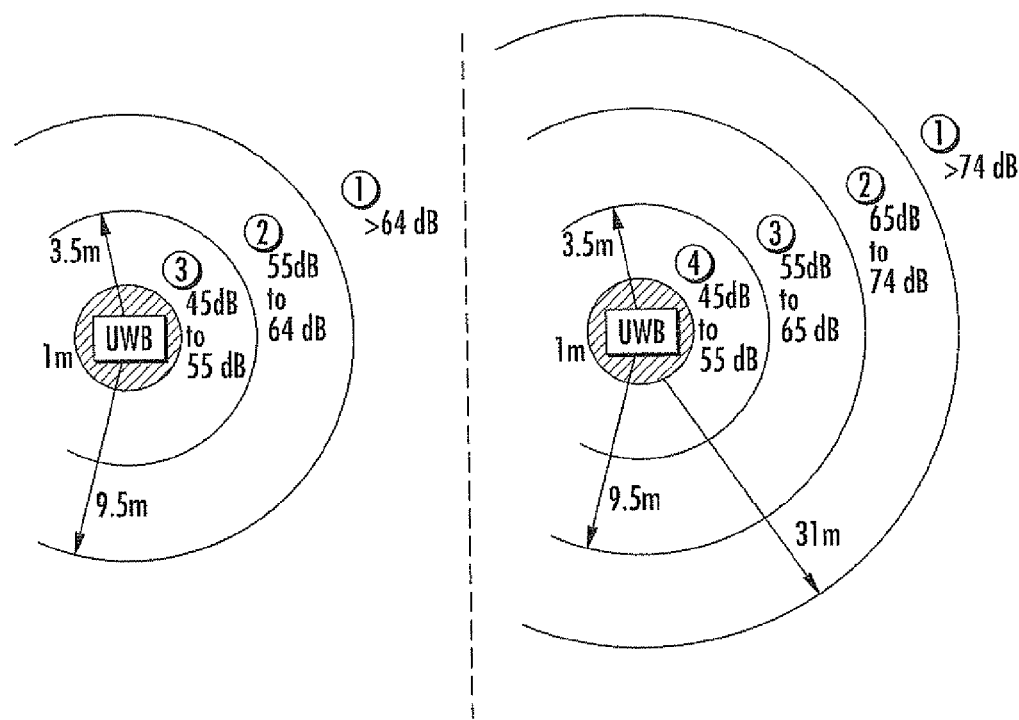
FIG. 4 illustrates a region segmentation and corresponding path losses, according to the present invention.

It is thus possible to make a segmentation into different interference power regions or isolation regions as illustrated in FIG. 4. In this figure, the UWB apparatus APP1 has been represented in the center of these regions with the victim apparatus being potentially located in one of these regions. However, in an equivalent manner, it would be also possible to represent the victim apparatus in the center of these regions with the UWB apparatus being potentially located in one of these regions.

In this figure, the corresponding path loss in dB (which thus corresponds to an interference power or isolation information) is represented within each region, with LoS ("Line of Sight") distance in meters (assuming a standard LoS path). The left part of FIG. 4 corresponds to a WIMAX allowed interference level equal to −105 dBm/MHz whereas the right part of FIG. 4 represents a WIMAX allowed interference level equal to −115 dBm/MHz. Each region, referenced 1 to 4, corresponds to a range of maximum allowed transmit power of the UWB apparatus APP1. More precisely, region 1 is a region in which the maximum allowed transmit power is greater than −41.3 dBm/MHz. Region 2 corresponds to a range of allowed transmit power between −41.3 and −50 dBm/MHz. Region 3 corresponds to a range of −50 to −60 dBm/MHz and region 4 corresponds to a range of −60 to −70 dBm/MHz. Each region 2 to 4 is associated to a specific interference avoidance technique whereas no interference avoidance technique is applied in region 1. In other words, in region 1, the transmission processing of the UWB signal from the apparatus APP1 is not modified.

However, in regions 2 to 4, different interference avoidance processes are respectively applied. In the present example, interference avoidance can be done efficiently by removal (active or passive) of sub-carriers, also known by the person skilled in the art as "notching processes or techniques".

More precisely, for example, in region 2, a conventional tone nulling is sufficient. The tone nulling includes suppressing the tones or sub-carriers associated to the corresponding frequencies or tones occupied by the WIMAX apparatus APP2. In region 3, a windowing technique is applied. More precisely, this notching technique includes applying a windowing mask for suppressing also the side lobs around the sub-band frequencies occupied by the WIMAX device. At last, in region 4, an active interference cancellation technique (AIC technique) is applied. Such a conventional technique is disclosed, for example, in "Active Interference Cancellation Technique for MB-OFDM Cognitive Radio"; Hirohisa Yamaguchi; 34th European Microwave Conference—Amsterdam 2004.

More precisely, according to this method, the band between sub-carriers s1 and s2 of an OFDM symbol is notched by: 1) zeroing every sub-carrier between s1 and s2, 2) modulating sub-carriers s1 and s2 using coefficients computed as a function of the OFDM symbol transmitted data, with the target of minimizing the energy in the band s1-s2. The band s1-s2 may be larger than the sub-carriers occupied by the victim apparatus. As a matter of fact, depending on the desired notch level, it can be helpful to zero some other sub-carriers around those actually occupied by the victim apparatus.

The herein disclosed splitting in regions is one possibility. Other interference avoidance techniques like band dropping, antenna techniques or switching to FFI (no band hopping mode) could be imagined leading to another partition. Band dropping could be an alternative to replace the complex AIC region as it is only needed in the rare cases when UWB and WIMAX devices are very close.

Depending on the assumption on the WIMAX RX sensitivity, the very costly AIC is not necessary at all (allowed interference=−105 dBm/MHz) or only with a WIMAX device in the radius of 3.5 m (allowed interference=−115 dBm/MHz). In all the other cases, less expensive notching can be used and for more than 3.5 m (allowed interference level=−105 dBm/MHz) or 9 m (allowed interference level=−115 dBm/MHz) simple tone nulling is sufficient. Thus, the use of a small set of more or less complex avoidance techniques allows the use of a flexible interference avoidance, including in the present example a stepwise notching.

Turning now again to FIG. 5, an example of a device permitting managing of the operation of the apparatus APP1 is disclosed. More precisely, detection means DTCM permits detection of the eventual presence of an interfering signal. Then first calculation means FCLM, including determination means DTEM and subtracting means SBTM, are adapted to determine the level of the interfering signal and to subtract the level to the transmit power of the interfering signal in order to determine the path loss between both apparatuses. A memory MM can be used for storing the above mentioned database including the TX power level PTx_victim and the operational frequency band of the second apparatus APP2.

The first calculation means may form also estimation means for estimating among the different interference power or isolation regions the region corresponding to the actual interference power between the apparatus APP1 and the detected victim apparatus APP2. Further, second calculation means SCLM determines from the path loss and from an allowed interference level at the victim apparatus APP2 the maximum allowed transmit power within the frequency sub-band (occupied by the victim apparatus) of the multi-carrier modulated signal to be transmitted from the first apparatus APP1. Then, control means CTLM adjust the processing of the UWB signal to be transmitted in accordance with the maximum allowed transmit power (or in accordance with the estimated interference power region). All these means may be realized by software modules within a microprocessor, or by a specific logic circuit.

Further, depending on the interference avoiding process which is selected, the control means may act on a different location of the transmission chain TXCH, for example, at the output of the IFFT means and/or after the OFDM modulator. Many different interfering signal detection methods are possible. For example, a well known detection technique is based on power measurement on the different OFDM carriers associated eventually to averaging operations over the available sub-carriers.

Another conventional technique may comprise using tunable filters in order to measure the power of the respective sub-carriers. However, an advantageous detection technique based on soft symbols or soft values after equalization may be now described.

The combination of this avoidance technique with enhanced detection techniques such as soft-value or soft symbols based detection leads to a robust detection and avoidance system. Soft-values or soft symbols detection may allow detection at an interference level much below the threshold of needed avoidance. This increases the protection reliability towards WIMAX because tracking of the evolution of the WIMAX interference power allows increasing or decreasing the detection frequency depending on the closeness of the WIMAX device to the outmost detection region.

Figure 6:
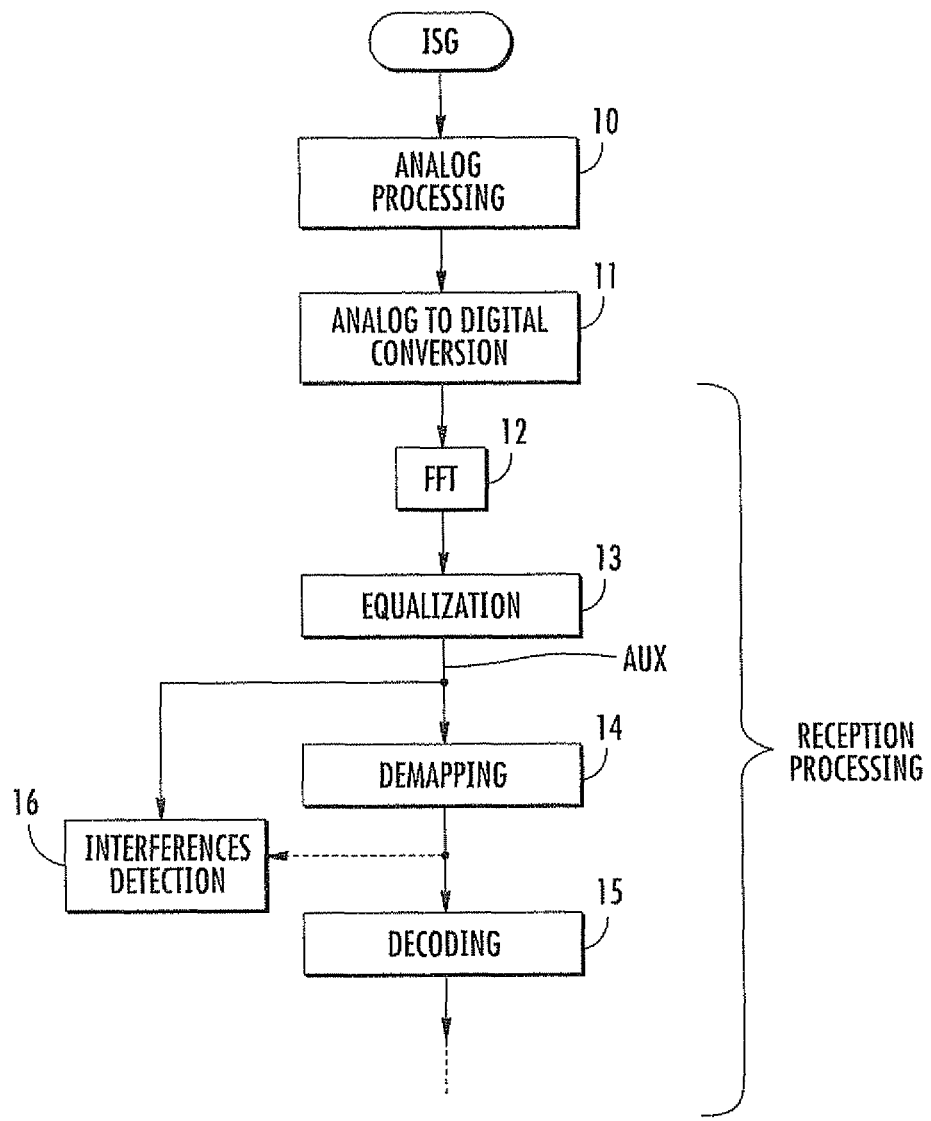
FIG. 6 illustrates diagrammatically a flow chart related to a processing method allowing detection of interference within an incident signal, according to the present invention.
Figure 7:
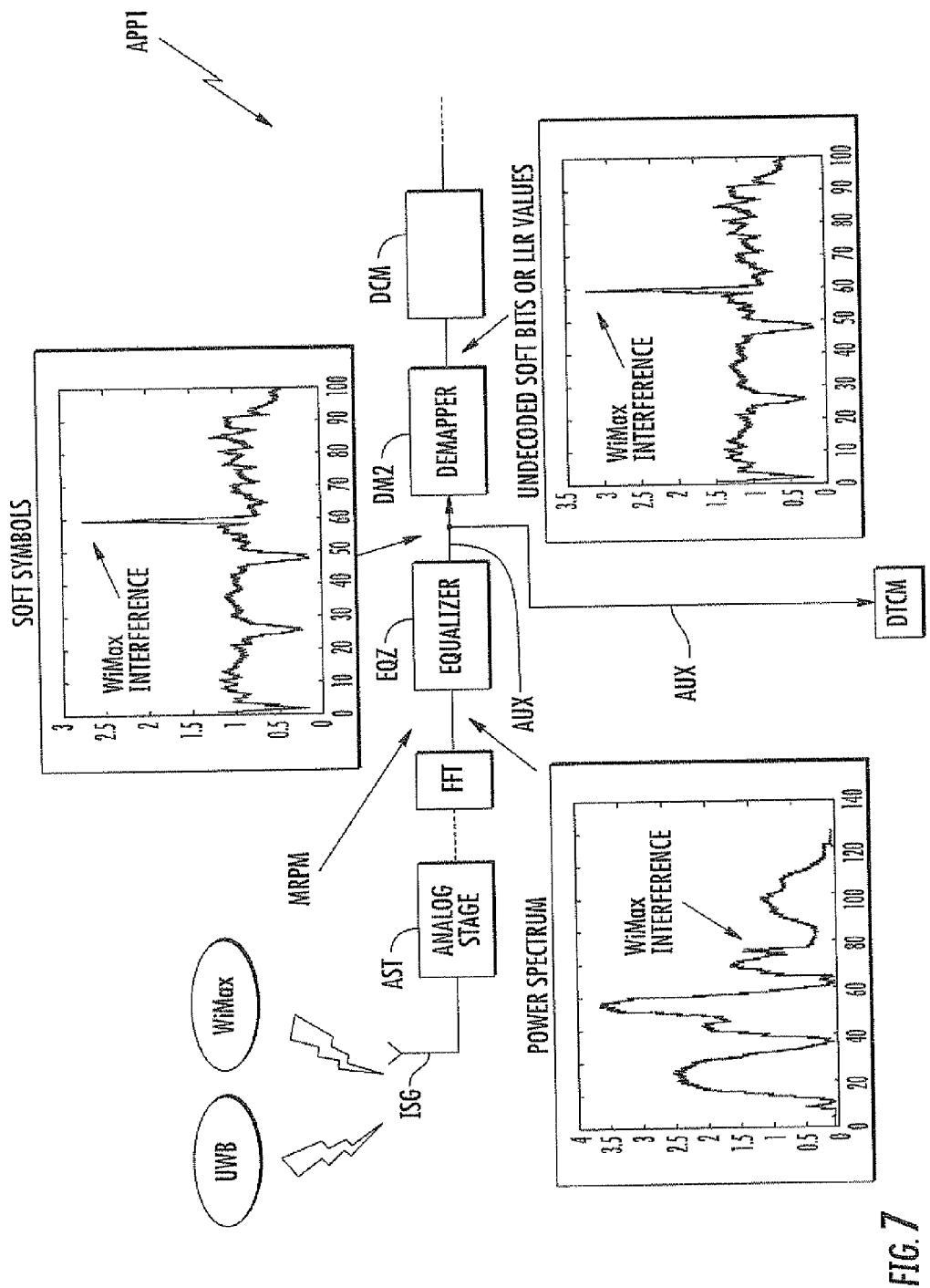
FIG. 7 illustrates diagrammatically an embodiment of an apparatus allowing detection of interference within an incident signal, according to the present invention.
Figure 8:
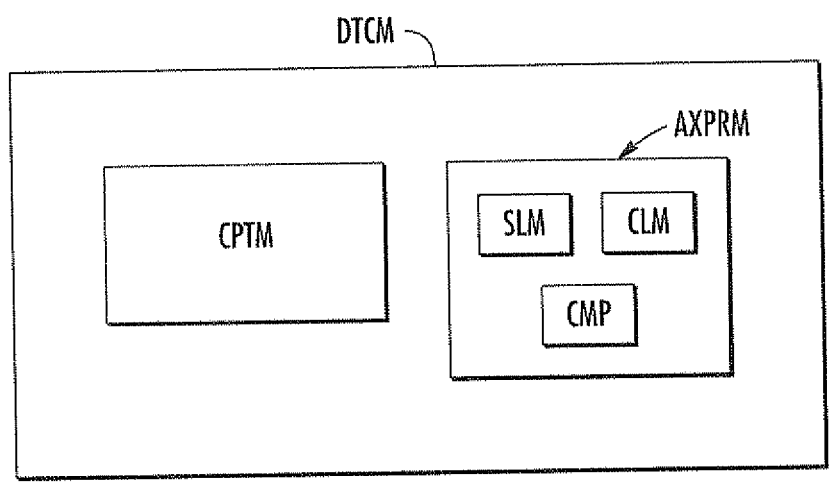
FIG. 8 illustrates in more detail, but still diagrammatically, a possible embodiment of the detector or detection means including in an apparatus of FIG. 7, according to the present invention.

As illustrated in FIG. 6 and in FIG. 7, an incident signal ISG is received by the wireless apparatus APP1. The signal ISG is processed (10, FIG. 6) within an analog stage AST. After an analog-to-digital conversion 11, a Fast Fourier Transform 12 is performed within FFT means in order to obtain a signal in the frequency domain. The reception processing means MRPM further comprises an equalizer EQZ performing an equalization processing 13 for providing a first signal AUX. The reception processing means MRPM further comprise a demapper DMP performing a demapping 14, and decoding means DCM performing a decoding process 15. All the means of the main reception processing means MRPM are conventional means or devices well known by the person skilled in the art.

The apparatus APP1 further comprises detection means DTCM coupled to the output of the equalization means. The detection means are adapted to receive the signal AUX in the frequency domain and are adapted to perform a digital detection process 16 on the signal AUX for detecting eventual interference within the incident signal ISO.

The signal AUX comprises digital information which are here "soft" symbols. One soft symbol is carried by one sub-carrier and a complete soft MB-OFDM symbol includes all the 128 soft symbols respectively associated to the 128 sub-carriers. If the signal AUX is taken at the output of the demapper the digital information are "soft" values or LLR values (LLR: Log Likelihood Ratio). As it is well known by the person skilled in the art, a "soft" or LLR value comprises a sign which represents the logical value of the digital value and the magnitude represents a confidence in this logical value. An above mentioned soft symbol is in general a complex value and contains more than one soft value depending on the kind of modulation.

The interference detection process is advantageously based on digital information after equalization, demapping, or at another point in the receiver chain, after compensation of the channel. As a matter of fact, the equalization flattens the channel and marks of interference appear much better recognizable with respect to a detection based on the power spectrum before equalization as illustrated in FIG. 7. In this figure, each diagram is in the frequency domain and corresponds to a complete MB-OFDM symbol with 100 used sub-carriers data averaged over the time using a sliding window approach.

Further, the use of soft symbols before demapping shows a good performance and in many cases as its handling is more flexible and simple than a use of soft values or LLR values after demapping. If the detection process is performed on the soft constellation points after demapping, all the LLR values coming from the same constellation point (e.g. 4 values in the case of 16-QAM) can be averaged to have one single detection value representing one sub-carrier.

Figure 9:
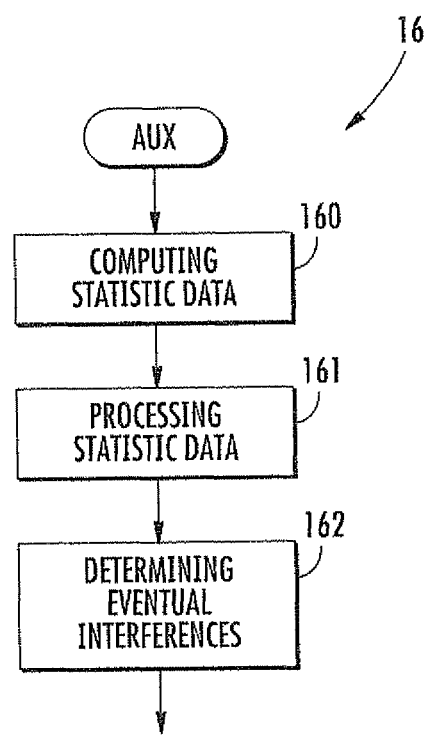
FIGS. 9 and 10 illustrate more detailed flow charts, according to the present invention; and, FIG. 11 illustrates curves showing interference levels, according to the present invention.

For continuous detection in time, looking at the evolution in time of statistical data for each sub-carrier independently, is advantageous. In such a case, as illustrated in FIG. 9, the interference detection processing 16 comprises computing (step 160) statistical data from the signal AUX, processing (161) the statistical data and determining eventual interference (162).

Figure 10:
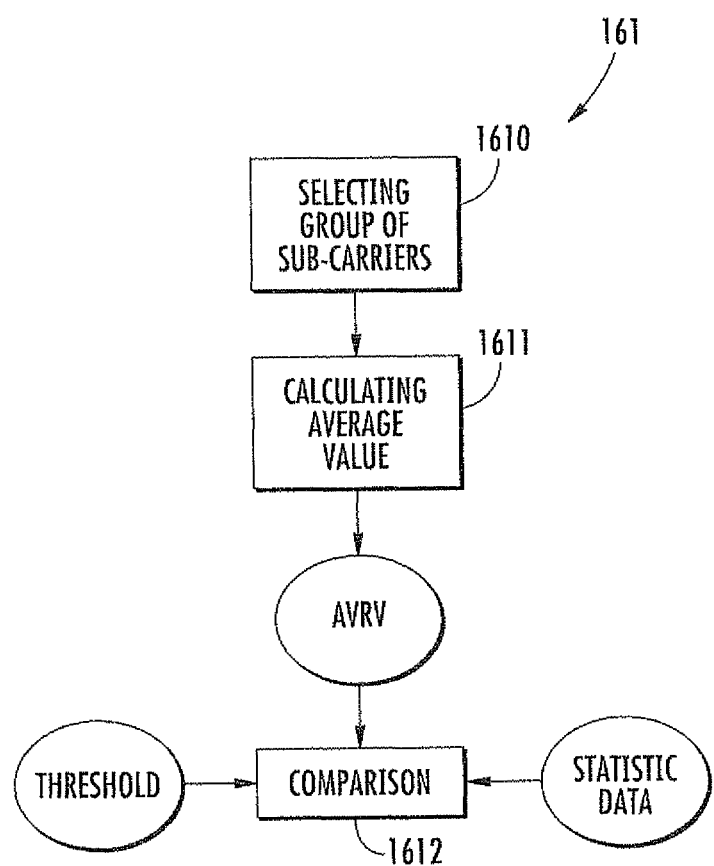

An example of processing 161 is illustrated in FIG. 10. It is based on statistical data. The statistical data are, for example, mean and/or variance computations over a sliding time-window of consecutive MB-OFDM symbols, computed in each sub-carrier independently. At each instant, the statistical data of one sub-carrier can be compared (1612 FIG. 10) to the average of the statistical data over the whole frequency band, i.e. all the sub-carriers. A detection threshold (sub-carrier divided by average ratio) may decide whether on a given sub-carrier at a given time instant interference exists. A detection threshold is, for example, 8 dB. Observing those decisions gives the system a global view of interferers.

Both types of statistical data are more powerful for detecting interference than the simple power estimation at the direct output of the FFT, i.e. before equalization, in the case of an operational UWB link. However, simulation results show that the variance estimation is more stable and therefore a more reliable metric than the mean. The average value (of mean or variance) over the sub-carriers can either be computed (1611 FIG. 10) taking into account all the sub-carriers or a selection only (1610 FIG. 10). If a known restricted frequency range for interference exists, the values of these sub-carriers can be excluded. Another possibility could be to leave out the x biggest values (x being a predefined number, e.g. 3).

For performing the processing 161, the detection means DTCM comprise computing means CPTM adapted to compute statistical data and auxiliary processing means AXPRM adapted to process the statistical data. More precisely, the auxiliary processing means AXPRM comprise selection means SLM adapted to select a group of at least some of the sub-carriers, calculation means CLM adapted to calculate an average value AVRV of the statistical data respectively associated to selected sub-carriers, and comparison means CMP adapted to compare one statistical data with the average value using a detection threshold equal, for example, to 8 dB, thereby deciding whether interference exists within the sub-carrier associated to the one statistical data value.

Figure 11:
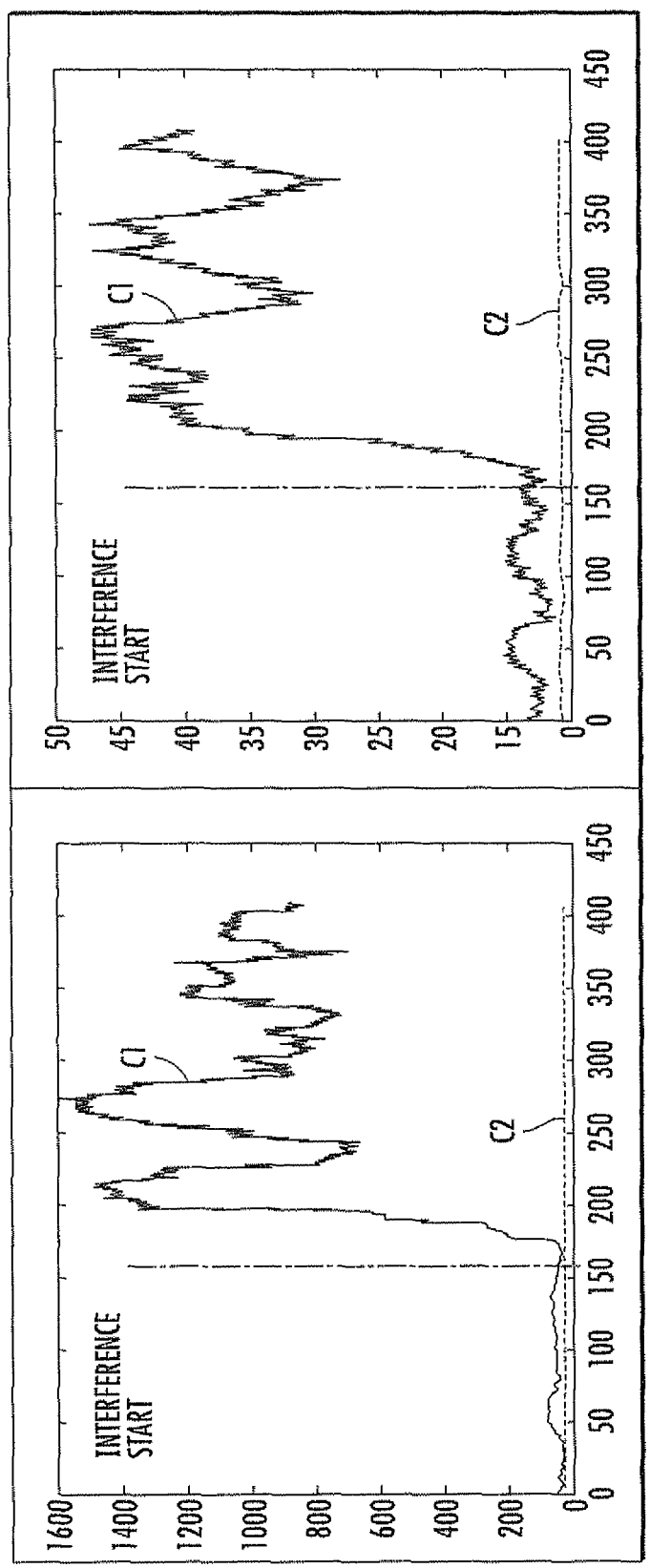

Further the power of the interferer in the signal can be easily obtained from the variance values by using a proportionality coefficient depending on the architecture of the receiving chain. On FIG. 11, a symbol-by-symbol sliding window of size 30 (OFDM) symbols is used. The left part of FIG. 11 illustrates the windowed variance over time. The straight line (curve C1) corresponds to a sub-carrier with starting interference after about 200 OFDM symbols, whereas the dashed line (curve C2) represents the average variance over almost all sub-carriers. The right part of FIG. 11 illustrates the windowed mean over time. The straight line (curve C1) corresponds to a sub-carrier with starting interference after about 200 OFDM symbols, whereas the dashed line (curve C2) represents the average mean over almost all sub-carriers.

That which is claimed:

1. A method of operating an apparatus in a wireless communication system, the method comprising:
   detecting, at the apparatus, an interfering signal emitted from a victim apparatus;
   estimating among different interference power regions, the different interference power regions respectively corresponding to different interference powers between a potential apparatus and a potential victim apparatus, an interference power region corresponding to an actual interference power between the apparatus and the victim apparatus, the estimating including determining, at the apparatus, a path loss between the apparatus and the victim apparatus;
   determining from the path loss and an allowed interference level at the victim apparatus a threshold allowed transmit power for a signal to be transmitted from the apparatus; and
   adjusting, at the apparatus, transmission processing of the signal to be transmitted within the wireless communication system based upon the estimated interference power region and the threshold allowed transmit power, for protecting the victim apparatus against interference, the adjusting comprising
      selecting an interference avoidance process from among a plurality thereof based upon the estimated interference power region, and
      performing the selected interference avoidance process, the plurality of interference avoidance processes comprising a side-lobe suppression process.

2. The method according to claim 1 wherein the estimating of the interference power region includes determining, at the apparatus, a level of the interfering signal.

3. The method according to claim 1 wherein the wireless communication system is an ultra wide band (UWB) wireless communication system.

4. A method of operating an apparatus in a wireless communication system and exchanging within the wireless communication system a multi-carrier modulated signal on a plurality of sub-carriers, the method comprising:
   detecting, at the apparatus, an interfering signal emitted from a victim apparatus on at least one sub-carrier from the plurality of sub-carriers;
   determining, at the apparatus, a path loss between the apparatus and the victim apparatus;
   determining from the path loss and an allowed interference level at the victim apparatus a threshold allowed transmit power on the at least one sub-carrier of a multi-carrier modulated signal to be transmitted from the apparatus; and
   adjusting, at the apparatus, processing of the multi-carrier modulated signal to be transmitted based upon the threshold allowed transmit power, for protecting the victim apparatus against interference, the adjusting comprising selecting an interference avoidance process from among a plurality thereof based upon an estimated interference power level, and performing the selected interference avoidance process, the plurality of interference avoidance processes comprising a side-lobe suppression process.

5. The method according to claim 4 wherein the detecting comprises:
   receiving, at the apparatus, an incident multi-carrier modulated signal on the plurality of sub-carriers; and
   performing reception processing on the incident multi-carrier modulated signal including an equalization processing providing a first signal and detecting the interfering signal from a second signal in a frequency domain, the second signal is obtained from the first signal.

6. The method according to claim 5 wherein the second signal is the first signal.

7. The method according to claim 5 wherein the second signal comprises digital information on the plurality of sub-carriers; detecting the interfering signal comprises determining statistical data from the digital information and processing the statistical data.

8. The method according to claim 7 wherein the incident multi-carrier modulated signal carries symbols; and wherein the statistical data comprises at least one of a mean value and a variance value computed over a sliding time-window of consecutive symbols for each sub-carrier of the plurality of sub-carriers independently.

9. The method according to claim 7 wherein the processing of the statistical data comprises:
   selecting a group of at least some of the plurality of sub-carriers;
   calculating an average value of statistical data respectively associated with the selected sub-carriers;
   comparing the statistical data with the average value using a threshold value; and
   based upon the comparing, deciding whether interference exists within a frequency sub-band corresponding to a sub-carrier associated with the statistical data.

10. The method according to claim 4 wherein the multi-carrier modulated signal is a signal modulated according to an orthogonal frequency-division multiplexing (OFDM) modulation scheme.

11. The method according to claim 4 wherein the multi-carrier modulated signal is a signal modulated according to a generalized multi-carrier modulation scheme.

12. The method according to claim 4 wherein the determining of the path loss comprises determining, at the apparatus, a level of the interfering signal and subtracting the level from a transmit power of the interfering signal.

13. A method of operating a first wireless communications device in a wireless communication system, the method comprising:
   detecting a signal emitted from a second wireless communications device;
   estimating among different interference power regions, the different interference power regions respectively corresponding to different interference powers between a potential first wireless communications device and a potential second wireless communications device, an interference power region corresponding to an actual interference power with the second wireless communications device, the estimating comprising determining a path loss with the second wireless communications device;
   determining from the path loss and an allowed interference level at the second wireless communications device a threshold allowed transmit power for a signal to be transmitted; and adjusting processing of the signal to be transmitted based upon the estimated interference power region and the threshold allowed transmit power, the adjusting comprising
- selecting an interference avoidance process from among a plurality thereof based upon the estimated interference power region, and
- performing the selected interference avoidance process, the plurality of interference avoidance processes comprising a side-lobe suppression process.

14. The method according to claim 13 wherein the estimating of the interference power region includes determining a level of the signal from the second wireless communications device.

15. An apparatus in a wireless communication system, the apparatus comprising:
- a detector configured to detect an interfering signal emitted from a victim apparatus;
- an estimator configured to estimate among different interference power regions, the interference power regions respectively corresponding to different interference powers between a potential apparatus and a potential victim apparatus, an interference power region corresponding to an actual interference power between the apparatus and the victim apparatus;
- said estimator configured to determine, at the apparatus, a path loss between the apparatus and the victim apparatus, and determine from the path loss and an allowed interference level at the victim apparatus a threshold allowed transmit power of a signal to be transmitted from the apparatus; and
- a controller configured to adjust processing of the signal to be transmitted based upon the estimated interference power region and the threshold allowed transmit power, for protecting the victim apparatus from interference, the adjusting comprising
  - selecting an interference avoidance process from among a plurality thereof based upon the estimated interference power region, and
  - performing the selected interference avoidance process, the plurality of interference avoidance processes comprising a side-lobe suppression process.

16. The apparatus according to claim 15 wherein said estimator comprises a determiner configured to determine a level of the interfering signal.

17. The apparatus according to claim 15 wherein the wireless communication system is an ultra wide band (UWB) wireless communication system.

18. The apparatus according to claim 15 wherein the signal to be transmitted from the apparatus is a multi-carrier modulated signal.

19. An apparatus of a wireless communication system for exchanging within the wireless communication system a multi-carrier modulated signal on a plurality of sub-carriers, the apparatus comprising:
- a detector configured to detect an interfering signal from a victim apparatus on at least one sub-carrier from the plurality thereof;
- a first calculator configured to determine, at the apparatus, a path loss between the apparatus and the victim apparatus;
- a second calculator configured to determine from the path loss and an allowed interference level at the victim apparatus a threshold allowed transmit power on the at least one sub-carrier of a multi-carrier modulated signal to be transmitted from the apparatus; and
- a controller configured to adjust processing of the multi-carrier modulated signal to be transmitted based upon the threshold allowed transmit power, the adjusting comprising selecting an interference avoidance process from among a plurality thereof based upon an estimated interference power level, and performing the selected interference avoidance process, the plurality of interference avoidance processes comprising a side-lobe suppression process.

20. The apparatus according to claim 19 wherein said first calculator comprises:
- a determiner configured to determine a level of the interfering signal; and
- a subtractor configured to subtract the level of the interfering signal from a transmit power of the interfering signal.

21. The apparatus according to claim 20 further comprising a memory configured to store a database including the transmit power of the interfering signal.

22. The apparatus according to claim 21 wherein the database further includes an operational frequency band of the victim apparatus.

23. The apparatus according to claim 19, further comprising:
- an input configured to receive an incident multi-carrier modulated signal on the plurality of sub-carriers; and
- a reception processor coupled to said input and including an equalizer configured to deliver a first signal;
- said detector being coupled to an output of said equalizer and configured to receive a second signal in a frequency domain, the second signal obtained from the first signal.

24. The apparatus according to claim 23 wherein said detector is directly coupled to the output of said equalizer.

25. The apparatus according to claim 23 wherein the second signal comprises digital information on the plurality of sub-carriers; and wherein said detector comprises a processor configured to compute statistical data from the digital information, and an auxiliary processor for processing the statistical data.

26. The apparatus according to claim 25 wherein the incident signal carries symbols; and
wherein said processor is configured to compute as the statistical data, at least one of a mean value and a variance value over a sliding time-window of consecutive symbols for each sub-carrier of the plurality of sub-carriers independently.

27. The apparatus according to claim 25 wherein said auxiliary processor comprises:
- an auxiliary selector configured to select a group of at least some of said plurality of sub-carriers;
- an auxiliary calculator configured to calculate an average value of statistical data respectively associated with the selected group of sub-carriers;
- an auxiliary comparer configured to compare at least one value from the statistical data with an average value, thereby deciding whether interferences exist within a frequency sub-band corresponding to a sub-carrier associated with the at least one value from the statistical data.

28. A wireless communications device in a wireless communication system, the wireless communications device comprising:
- a detector configured to detect a signal emitted from an other wireless communications device;
- an estimator configured to estimate among different interference power regions, the different interference power regions respectively corresponding to different interference powers between a potential wireless communications device and a potential other wireless communications device, an interference power region corresponding to an actual interference power with the other wireless communications device;

said estimator configured to determine a path loss with the other wireless communications device, and determine from the path loss and an allowed interference level at the other wireless communications device a threshold allowed transmit power of a signal to be transmitted; and a controller configured to adjust processing of the signal to be transmitted based upon the estimated interference power region and the threshold allowed transmit power, the adjusting comprising selecting an interference avoidance process from among a plurality thereof based upon the estimated interference power region, and performing the selected interference avoidance process, the plurality of interference avoidance processes comprising a side-lobe suppression process.

29. The wireless communications device according to claim 28 wherein the estimate of the interference power region includes determining a level of the signal from the other wireless communications device.

* * * * *